(12) United States Patent
Kramer et al.

(10) Patent No.: US 10,407,533 B2
(45) Date of Patent: Sep. 10, 2019

(54) FAST-CURING COMPOSITION CONTAINING SILANE GROUPS

(71) Applicant: SIKA TECHNOLOGY AG, Baar (CH)

(72) Inventors: Andreas Kramer, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 77 days.

(21) Appl. No.: 15/519,500

(22) PCT Filed: Nov. 23, 2015

(86) PCT No.: PCT/EP2015/077373
§ 371 (c)(1),
(2) Date: Apr. 14, 2017

(87) PCT Pub. No.: WO2016/083309
PCT Pub. Date: Jun. 2, 2016

(65) Prior Publication Data
US 2017/0240689 A1    Aug. 24, 2017

(30) Foreign Application Priority Data

Nov. 24, 2014  (EP) .................................. 14194600

(51) Int. Cl.
```
C08G 18/83    (2006.01)
C08G 18/48    (2006.01)
C08G 18/71    (2006.01)
C08G 18/75    (2006.01)
C08G 18/10    (2006.01)
C08G 18/12    (2006.01)
C08G 18/22    (2006.01)
C08G 65/336   (2006.01)
C09J 175/08   (2006.01)
C08G 65/333   (2006.01)
C08G 18/62    (2006.01)
C08G 18/76    (2006.01)
C08L 75/08    (2006.01)
C09D 175/08   (2006.01)
```

(52) U.S. Cl.
CPC ........... *C08G 18/837* (2013.01); *C08G 18/10* (2013.01); *C08G 18/12* (2013.01); *C08G 18/227* (2013.01); *C08G 18/4808* (2013.01); *C08G 18/4866* (2013.01); *C08G 18/6204* (2013.01); *C08G 18/718* (2013.01); *C08G 18/755* (2013.01); *C08G 18/7621* (2013.01); *C08G 65/336* (2013.01); *C08G 65/33351* (2013.01); *C08L 75/08* (2013.01); *C09D 175/08* (2013.01); *C09J 175/08* (2013.01); *C08G 2190/00* (2013.01)

(58) Field of Classification Search
CPC ...................................................... C08L 101/10
See application file for complete search history.

(56) References Cited

U.S. PATENT DOCUMENTS 5,068,304 A * 11/1991 Higuchi ................. C08G 18/10
                                                    528/25
2011/0034627 A1    2/2011  Boudet et al.

FOREIGN PATENT DOCUMENTS

DE    10 2008 020 979 A1    10/2009

OTHER PUBLICATIONS

Dec. 14, 2015 International Search Report issued in International Patent Application No. PCT/EP2015/077373.

* cited by examiner

Primary Examiner — Kuo Liang Peng
(74) Attorney, Agent, or Firm — Oliff PLC

(57) ABSTRACT

A polymer preparation consisting of silane-functional polymers, including at least one polymer having at least one terminal group of formula (I) and at least one further silane terminal group, a method for producing the polymer preparation and a composition containing it. The polymer preparation has a surprisingly low viscosity, cross-links surprisingly quickly even without the use of EHS-critical catalysts such as organotin compounds or DBU, and hardens into a non-sticky material with good strength and elasticity. It is especially well suited as an elastic adhesive or sealant or as an elastic coating. The invention further relates to a method for lowering the viscosity of a polymer having at least one terminal group of formula (I) by introducing at least one further silane terminal group.

15 Claims, No Drawings

FAST-CURING COMPOSITION CONTAINING SILANE GROUPS

TECHNICAL FIELD

The invention relates to polymers containing silane groups and to the use thereof in curable compositions usable especially for bonding, sealing or coating of construction and industrial products.

STATE OF THE ART

Polymers containing silane groups, also referred to as "silane-functional polymers" or "silane-modified polymers" (SMP) or "silane-terminated polymers" (STP), have been used successfully for some time as binders in moisture-curing compositions which find use especially as elastic adhesives, sealants or coatings in the construction and manufacturing industry, and constitute an isocyanate-free alternative to the traditional polyurethanes.

Silane-functional polymers can be obtained in a very simple manner from polyurethane polymers, by converting the isocyanate group functionalities thereof to silane groups by means of amino- or hydroxysilanes. Such silane-functional polyurethanes crosslink relatively rapidly and cure to give nontacky materials of good strength and extensibility. With their high content of hydrogen bond-forming urethane and/or urea groups, however, they are of relatively high viscosity and therefore not always processible in a simple manner.

Silane-functional polymers having lower viscosity that are free of urea groups and contain only few urethane groups, if any at all, are likewise known and are obtainable, for example, by reaction of polyether polyols with isocyanatosilanes or by hydrosilylation of allyl-functional polyethers. Such silane-functional polymers are popular because of their easy processability and are therefore supplied commercially by many manufacturers. However, they are much slower to react, and hence crosslink slowly and remain tacky for a long time. Large amounts of highly active catalysts are often needed for sufficiently rapid and complete curing. Moreover, after curing, they usually do not attain the mechanical quality of the silane-functional polyurethane polymers obtained via amino- or hydroxysilanes.

Highly active catalysts that are conventionally used are organotin compounds. However, these are harmful to health and hazardous to the environment, and for those reasons their use is increasingly undesirable. As an alternative to organotin compounds, organotitanates are often used, but these have lower catalytic activity compared to organotin compounds, and for that reason they are used either in a very high dosage or in combination with strong bases, especially cyclic amidines such as 1,8-diazabicyclo[5.4.0]undec-7-ene (DBU). However, DBU is likewise a substance which is harmful to health and hazardous to the environment, and also odorous, and is additionally only of limited compatibility in compositions based on silane-functional polymers, such that they have a tendency to separation, sweating or substrate soiling. There is therefore a need for a low-viscosity silane-functional polymer with high crosslinking speed.

SUMMARY OF THE INVENTION

It is therefore an object of the present invention to provide a silane-functional polymer which has a low viscosity and crosslinks rapidly even without the use of EHS-critical catalysts such as organotin compounds or DBU, and at the same time cures to give a nontacky material of good strength and extensibility. It has been found that, surprisingly, this object is achieved by a polymer formulation as claimed in claim 1. It is simple to produce, has good storability, has surprisingly low viscosity and cures surprisingly rapidly with moisture to give an elastic material having good strength, extensibility and thermal stability, even when the catalyst present is merely an organotitanate without an additional strong base.

What is especially surprising is the fact that the high reactivity of the end groups of the formula (I) is transmitted to the entire polymer formulation and this results, in spite of the silane groups of different reactivity, on curing, in a material having good mechanical properties.

The polymer formulation as claimed in claim 1 contains a polymer having at least one end group of the formula (I) and at least one further silane end group. The polymer thus contains various silane end groups in the same molecule.

What is particularly surprising is the circumstance that such a polymer formulation is of distinctly lower viscosity than a mixture of two silane-functional polymers in which one of the two polymers has only end groups of the formula (I) and the other has only further silane end groups when the same end groups are present in the same ratio in the mixture as in the polymer formulation.

The invention further provides a method as claimed in claim 15. By this method, it is possible to modify polymers having end groups of the formula (I) that cure rapidly but are of relatively high viscosity in such a way that they have a distinctly lower viscosity, with substantial maintenance of the rapid curing.

Further aspects of the invention are the subject of further independent claims. Particularly preferred embodiments of the invention are the subject of the dependent claims.

WAYS OF EXECUTING THE INVENTION

The invention provides a polymer formulation consisting of silane-functional polymers comprising at least one polymer having at least one end group of the formula (I)

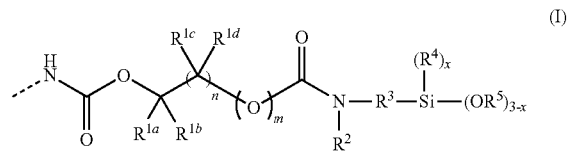

where
$R^{1a}$, $R^{1b}$, $R^{1c}$ and $R^{1d}$ are each independently a hydrogen atom or a monovalent hydrocarbyl radical having 1 to 12 carbon atoms, or in pairs are each an alkylene radical having 2 to 6 carbon atoms, $R^2$ is a hydrogen atom or a monovalent hydrocarbyl radical which has 1 to 12 carbon atoms and optionally contains ether groups, ester groups, nitrile groups, amino groups or silane groups, $R^3$ is a linear or branched alkylene or cycloalkylene radical having 1 to 20 carbon atoms, optionally having aromatic components, and optionally having one or more heteroatoms, especially nitrogen atoms, $R^4$ is an alkyl radical having 1 to 8 carbon atoms, $R^5$ is an alkyl radical which has 1 to 10 carbon atoms and optionally contains ether groups, x is 0 or 1 or 2, m is 0 or 1, and n is 0 or 1 or 2 or 3 or 4 or 5, where n, if m is 1, is 1 or 2 or 3 or 4;

and at least one further silane end group that does not correspond to the formula (I).

If n is 2 or 3 or 4 or 5, the $R^{1c}$ radicals may be different than one another. If n is 2 or 3 or 4 or 5, the $R^{1d}$ radicals may be different than one another.

In the present document, the term "alkoxysilane group" or "silane group" for short refers to a silyl group which is bonded to an organic radical and has one to three, especially two or three, hydrolyzable alkoxy radicals on the silicon atom. A "methoxysilane group" refers to a silane group having exclusively methoxy radicals as alkoxy radicals. An "ethoxysilane group" refers to a silane group having exclusively ethoxy radicals as alkoxy radicals.

The term "alkoxysilane" or "silane" for short refers to an organic compound having at least one silane group.

The term "hydrosilane" refers to a silane having a hydrogen atom rather than an organic radical.

"Hydroxysilane", "isocyanatosilane", "aminosilane" and "mercaptosilane" refer respectively to silanes having one or more hydroxyl, isocyanato, amino and mercapto groups on the organic radical in addition to the silane group. Substance names beginning with "poly", such as polyol or polyisocyanate, refer to substances which, in a formal sense, contain two or more functional groups that occur in their name per molecule.

"Molecular weight" in the present document is understood to mean the molar mass (in grams per mole) of a molecule or part of a molecule, also referred to as "radical". "Average molecular weight" is understood to mean the number average $M_n$ of an oligomeric or polymeric mixture of molecules or radicals, which is typically determined by means of gel permeation chromatography (GPC) against polystyrene as standard.

"Storage-stable" or "storable" refers to a substance or composition when it can be stored at room temperature in a suitable container over a prolonged period, typically at least 3 months up to 6 months or more, without undergoing any change to a degree of relevance for its use in its application or use properties, especially in the viscosity and the cross-linking rate, as a result of the storage. The term "viscosity" refers in the present document to the dynamic viscosity or shear viscosity which is defined by the ratio between the shear stress and the shear rate (speed gradient) and is determined as described in the working examples.

A dotted line in the formulae in this document in each case represents the bond between a substituent and the corresponding remainder of the molecule. "Room temperature" refers to a temperature of 23° C.

The polymer formulation preferably consists of silane-functional polymers that are polyethers and/or polyesters and/or polycarbonates containing silane groups.

More preferably, it consists of silane-functional polymers that are polyethers containing silane groups. These have a majority of oxyalkylene units, especially 1,2-oxypropylene units.

In the polymer formulation, the majority of the end groups of the formula (I) of the silane-functional polymers are preferably bonded to cycloaliphatic or aromatic radicals, especially to cycloaliphatic radicals derived from isophorone diisocyanate. The further silane end groups are preferably bonded directly to a polyether or polyester or polycarbonate radical without further radicals.

With end groups of the formula (I) bonded to cycloaliphatic radicals, the silane-functional polymers are particularly light-stable.

With further silane end groups bonded directly to a polyether or polyester or polycarbonate radical, the silane-functional polymers are of particularly low viscosity.

The polymer formulation is preferably free of isocyanate groups.

The silane-functional polymers in the polymer formulation have an average of preferably 1.3 to 4, especially 1.5 to 3 and more preferably 1.7 to 2.8 silane groups per molecule.

Preferably, the silane-functional polymers in the polymer formulation overall have an average molecular weight in the range from 1,000 to 30,000 g/mol, preferably 2,000 to 25,000 g/mol, more preferably 3,000 to 20,000 g/mol. This enables an advantageous combination of low viscosity and good mechanical properties.

The polymer formulation comprises at least one polymer having at least one end group of the formula (I).

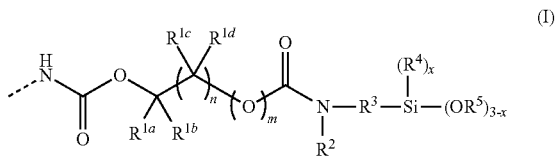

If m is 0, n is preferably 0 or 2.

If m is 1, n is preferably 1.

Preferably, m is 0.

$R^{1a}$ is preferably a hydrogen atom or a methyl radical or an n-butyl radical, especially a methyl radical.

$R^{1b}$ is preferably a hydrogen atom or a methyl radical, especially a hydrogen atom.

$R^{1c}$ is preferably a hydrogen atom or a methyl radical, especially a hydrogen atom.

$R^{1d}$ is preferably a hydrogen atom or a methyl radical, especially a hydrogen atom.

$R^2$ is preferably a hydrogen atom.

$R^3$ is preferably a linear or branched alkylene radical having 1 to 6 carbon atoms.

More preferably, the $R^3$ radical is selected from the group consisting of methylene, 1,3-propylene, 2-methyl-1,3-propylene, 1,4-butylene, 3-methyl-1,4-butylene and 3,3-dimethyl-1,4-butylene. Among these, particular preference is given to 1,3-propylene or 3,3-dimethyl-1,4-butylene, especially 1,3-propylene.

The position of the substituents in the $R^3$ radicals is numbered starting from the silicon atom.

$R^4$ is preferably a methyl radical.

$R^5$ is preferably a methyl radical or an ethyl radical.

x is preferably 0 or 1, especially 0. End groups of this kind are particularly reactive.

Particular preference is given to end groups of the formula (I) in which m is 0, n is 0, $R^{1a}$ is a methyl radical and $R^{1b}$ is a hydrogen atom. End groups of this kind are particularly reactive, preparable in a particularly simple manner and in particularly pure form, and very particularly storage-stable.

Particular preference is further given to end groups of the formula (I) in which m is 0, n is 2, $R^{1a}$ is a methyl radical or an n-butyl radical, especially a methyl radical, and $R^{1b}$, $R^{1c}$ and $R^{1d}$ are each a hydrogen atom. End groups of this kind are particularly reactive, preparable in a particularly simple manner and in quite a pure form, and particularly storage-stable.

Preference is further given to end groups of the formula (I) in which m is 1, n is 1, $R^{1a}$ is a methyl radical and $R^{1b}$, $R^{1c}$ and $R^{1d}$ are each a hydrogen atom. End groups of this kind are preparable in a particularly simple manner. A polymer having such end groups of the formula (I) typically also contains a considerable proportion of end groups of the formula (I) in which m is 1, n is 1, $R^{1c}$ is a methyl radical and $R^{1a}$, $R^{1b}$ and $R^{1d}$ are each a hydrogen atom.

The polymer formulation comprises at least one polymer having at least one further silane end group that does not correspond to the formula (I).

Preferably, the further silane end group is an end group of the formula (II)

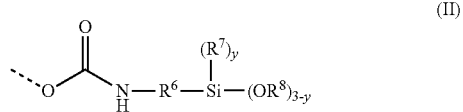

(II)

where $R^6$ is a linear or branched alkylene or cycloalkylene radical having 1 to 20 carbon atoms, optionally having aromatic components, $R^7$ is an alkyl radical having 1 to 8 carbon atoms, $R^8$ is an alkyl radical which has 1 to 10 carbon atoms and optionally contains ether groups, and y is 0 or 1 or 2.

End groups of the formula (II) are obtainable from commercially available starting compounds and enable silane-functional polymers having a low viscosity.

$R^6$ is preferably a linear or branched alkylene radical having 1 to 6 carbon atoms, more preferably methylene or 1,3-propylene, especially 1,3-propylene.

$R^7$ is preferably a methyl radical.

$R^8$ is preferably a methyl radical or an ethyl radical.

y is preferably 0 or 1, especially 0. End groups of this kind are particularly reactive.

End groups of the formula (II) are preparable in a particularly simple manner and enable a low viscosity of the polymer formulation.

Further preferably, the further silane end group is an end group of the formula (III)

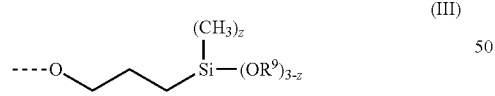

(III)

where $R^9$ is a methyl radical or an ethyl radical and z is 0 or 1 or 2.

Preferably, z is 0 or 1, especially 1.

Preferably, $R^9$ is a methyl radical.

End groups of the formula (III) enable a particularly low viscosity of the polymer formulation.

In the end groups of the formula (II) and in the end groups of the formula (III), the oxygen atom via which the particular end group is bonded to the polymer is preferably bonded directly, i.e. without any further bonding element, to a polyether or polyester or polycarbonate radical, especially a polyether radical. A polymer having such end groups of the formula (II) or (III) is of particularly low viscosity.

In the case of end groups of the formula (II), $R^5$ and $R^8$ are preferably identical radicals, especially methyl or ethyl radicals.

In the case of end groups of the formula (III), $R^5$ and $R^9$ are preferably identical radicals, especially methyl radicals.

As a result, the curing of the polymer releases just one kind of alcohol. In the case of polymers having silane groups having different alkoxy radicals, it is possible for the silane groups to exchange alkoxy radicals with one another by transesterification during storage, which can result in a significant change in the curing speed of the polymer, and this is usually undesirable.

Preferably, the polymer formulation has either exclusively silane-functional polymers having methoxysilane groups or exclusively silane-functional polymers having ethoxysilane groups.

Silane-functional polymers having exclusively methoxysilane groups have the advantage of crosslinking particularly rapidly with moisture.

Silane-functional polymers having exclusively ethoxysilane groups have the advantage of being particularly storage-stable, and of releasing ethanol, which is less toxic, in the course of curing.

The silane-functional polymers in the polymer formulation overall preferably have a ratio between the number of end groups of the formula (I) and the number of further silane end groups, especially end groups of the formula (II) or the formula (III), in the range from 99/1 to 5/95, more preferably in the range from 97/3 to 20/80, especially in the range from 95/5 to 50/50. Such a polymer formulation has an advantageous combination of low viscosity and rapid curing.

It is also possible that, in the polymer formulation, as well as polymers having end groups of the formula (I), both polymers having end groups of the formula (II) and polymers having end groups of the formula (III) are additionally present.

The invention further provides a process for producing a polymer formulation as described above, comprising the steps of providing a polymer containing at least one hydroxyl group and at least one silane end group which does not correspond to the formula (I) as first intermediate;

reacting the first intermediate with at least one diisocyanate at an NCO/OH ratio of more than 1 to give a second intermediate; and reacting the second intermediate with at least one hydroxysilane of the formula (VI) at an NCO/OH ratio of not more than 1.

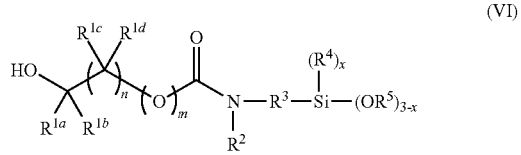

(VI)

In the formulae (IV), (V) and (VI), m, n, x, y, z, $R^{1a}$, $R^{1b}$, $R^{1c}$, $R^{1d}$, $R^2$, $R^3$, $R^4$, $R^5$, $R^6$, $R^7$, $R^8$ and $R^9$ have the definitions already given.

The process is preferably conducted with exclusion of moisture at a temperature of 20° C. to 120° C., especially 50° C. to 100° C., optionally in the presence of suitable catalysts. Preference is given to using at least one catalyst active for the OH—NCO reaction, especially a bismuth(III) compound or a zinc(II) compound.

The first intermediate is preferably prepared by reacting at least one polyol with at least one isocyanatosilane of the formula (IV) at an NCO/OH ratio of less than 1

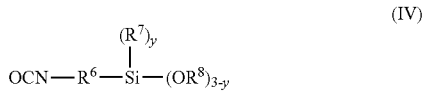

or
at least one polyol having allyl groups with at least one hydrosilane of the formula (V) with hydrosilylation of the allyl groups.

The reaction of a polyol with an isocyanatosilane of the formula (IV) to give the first intermediate gives rise especially to end groups of the formula (II). For this reaction, the NCO/OH ratio is preferably in the range from 0.01 to 0.95, especially 0.03 to 0.80, more preferably 0.05 to 0.50. Preferably, the isocyanatosilane is converted fully here, such that the first intermediate is free of isocyanate groups prior to the continuation of the process.

The reaction of a polyol having allyl groups with a hydrosilane of the formula (V) to give the first intermediate gives rise especially to end groups of the formula (III). At least one further polyol that has no allyl groups may be present here, and/or a further polyol that has no allyl groups may be added to the product prior to the further implementation of the process. Preferably, the first intermediate is free of allyl groups and has a ratio between OH groups and end groups of the formula (III) in the range from 0.01 to 0.95, especially 0.03 to 0.80, more preferably 0.05 to 0.50.

In the reaction of the first intermediate with a diisocyanate to give the second intermediate, the NCO/OH ratio is preferably in the range from 1.2 to 5, especially 1.4 to 4, more preferably 1.6 to 3. Preferably, the hydroxyl groups present are converted fully here, such that the second intermediate is free of hydroxyl groups. The choice of a ratio below 2 specifically brings about an extension of the polymer chain.

In the reaction of the second intermediate with a hydroxysilane of the formula (VI), the NCO/OH ratio is preferably in the range from 0.5 to 1, especially 0.8 to 1. Preferably, the isocyanate groups are converted fully here, such that the silane-functional polymer obtained is ultimately free of isocyanate groups.

The polymer formulation from the process described comprises at least one polymer having at least one end group of the formula (I) and at least one further silane end group. In addition, it typically comprises at least one further polymer having at least two end groups of the formula (I) and at least one further polymer having at least two further silane end groups. The further silane end groups here are preferably selected from end groups of the formula (II) and end groups of the formula (III).

It is possible, in the process described, to combine the steps for introduction of end groups of the formula (II) and for introduction of end groups of the formula (III) in a suitable manner, which results in a silane-functional polymer containing, as well as end groups of the formula (I), additionally both end groups of the formula (II) and end groups of the formula (III).

Preferred polyols for the process described are
polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having a plurality of OH or NH groups, for example ethane-1,2-diol, propane-1,2- and 1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- and -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those comprising styrene-acrylonitrile particles (SAN) or acrylonitrile-methyl methacrylate particles;

polyester polyols, especially from the polycondensation of hydroxycarboxylic acids or especially those which are prepared from di- to trihydric, especially dihydric, alcohols, for example ethylene glycol, diethylene glycol, propylene glycol, dipropylene glycol, neopentyl glycol, butane-1,4-diol, pentane-1,5-diol, 3-methylhexane-1,5-diol, hexane-1,6-diol, octane-1,8-diol, decane-1,10-diol, dodecane-1,12-diol, 1,12-hydroxystearyl alcohol, cyclohexane-1,4-dimethanol, dimer fatty acid diol (dimer diol), neopentyl glycol hydroxypivalate, glycerol or 1,1,1-trimethylolpropane or mixtures of the aforementioned alcohols, with organic di- or tricarboxylic acids, especially dicarboxylic acids, or the anhydrides or esters thereof, such as, more particularly, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid or trimellitic anhydride, or mixtures of the aforementioned acids, and also polyester polyols formed from lactones such as, more particularly, ε-caprolactone, and starters such as the aforementioned di- or trihydric alcohols; Particularly suitable polyester polyols are polyester diols.

polycarbonate polyols as obtainable by reaction, for example, of the abovementioned alcohols—used to form the polyester polyols—with dialkyl carbonates, diaryl carbonates or phosgene;

block copolymers bearing at least two hydroxyl groups and having at least two different blocks having polyether, polyester and/or polycarbonate structure of the type described above, especially polyether polyester polyols.

Particularly preferred polyols for the process described are polyether polyols, especially polyoxypropylenediols and/or polyoxypropylenetriols, or what are called ethylene oxide-terminated (EO-endcapped) polyoxypropylenediols or polyoxypropylenetriols. The latter are polyoxyethylenepolyoxypropylene copolyols, which are especially obtained by further alkoxylating polyoxypropylenediols or polyoxypropylenetriols with ethylene oxide on conclusion of the polypropoxylation reaction, as a result of which they ultimately have primary hydroxyl groups.

Preferred polyether polyols have a degree of unsaturation of less than 0.02 meq/g, especially less than 0.01 meq/g.

Preferred polyether polyols have an average molecular weight in the range from 500 to 30,000 g/mol, preferably 1,000 to 20,000 g/mol, especially 2,000 to 15,000 g/mol.

Preferred polyols having allyl groups for the process described are the polyols mentioned above, in which some of the hydroxyl groups have been converted to allyl ether end groups, for example by means of allyl chloride. Preferably, the polyol contains linear polyoxyalkylenes having an average of one hydroxyl end group and one allyl ether end group.

Preferred diisocyanates for the process described are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and/or 2,6-diisocyanate and any desired mixtures of these isomers (TDI), and diphenylmethane 4,4'-, 2,4'- and/or 2,2'-diisocyanate and any desired mixtures of these isomers (MDI). Particular preference is given to IPDI or TDI. Most preferred is IPDI. In this way, a polymer formulation having particularly good lightfastness is obtained.

Preferred isocyanatosilanes of the formula (IV) for the process described are isocyanatomethyltrimethoxysilane, isocyanatomethyldimethoxymethylsilane, isocyanatomethyltriethoxysilane, isocyanatomethyldiethoxymethylsilane, 3-isocyanatopropyltrimethoxysilane, 3-isocyanatopropyldimethoxymethylsilane, 3-isocyanatopropyltriethoxysilane or 3-isocyanatopropyldiethoxymethylsilane. Particular preference is given to 3-isocyanatopropyltrimethoxysilane or 3-isocyanatopropyltriethoxysilane.

Preferred hydrosilanes of the formula (V) for the process described are trimethoxyhydrosilane, dimethoxymethylhydrosilane, triethoxyhydrosilane or diethoxymethylhydrosilane, especially dimethoxymethylhydrosilane.

Preferred hydroxysilanes of the formula (VI) for the process described are selected from the group consisting of N-(3-trimethoxysilylpropyl)-2-hydroxypropanamide, N-(3-dimethoxymethylsilylpropyl)-2-hydroxypropanamide, N-(3-triethoxysilylpropyl)-2-hydroxypropanamide, N-(4-trimethoxysilylbutyl)-2-hydroxypropanamide, N-(4-triethoxysilylbutyl)-2-hydroxypropanamide, N-(2-methyl-4-trimethoxysilylbutyl)-2-hydroxypropanamide, N-(2-methyl-4-triethoxysilylbutyl)-2-hydroxypropanamide, N-(2,2-dimethyl-4-trimethoxysilylbutyl)-2-hydroxypropanamide, N-(2,2-dimethyl-4-triethoxysilylbutyl)-2-hydroxypropanamide, N-(3-triethoxysilylpropyl)-4-hydroxypentanamide and 2-hydroxypropyl N-(3-triethoxysilylpropyl)carbamate. Among these, preference is given to N-(3-trimethoxysilylpropyl)-2-hydroxypropanamide or N-(3-triethoxysilylpropyl)-2-hydroxypropanamide. These hydroxysilanes are preparable in a particularly simple manner and in particularly pure form and enable particularly high reactivities and particularly good mechanical properties.

A suitable hydroxysilane of the formula (VI) for the process described is preferably obtained by the reaction of at least one aminosilane of the formula (VII)

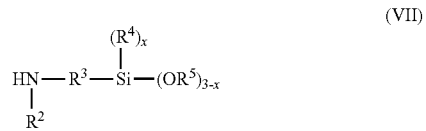

with at least one lactide of the formula (VIII) or at least one lactone or carbonate of the formula (IX).

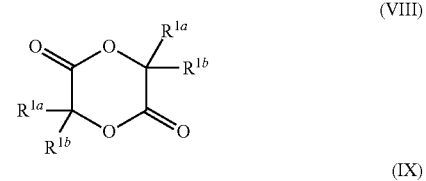

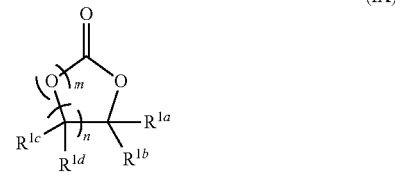

In the formulae (VII), (VIII) and (IX), m, n, x, $R^{1a}$, $R^{1b}$, $R^{1c}$, $R^{1d}$, $R^2$, $R^3$, $R^4$ and $R^5$ have the definitions already given.

The reaction of at least one aminosilane of the formula (VII) with at least one lactide of the formula (VIII) is preferably conducted with exclusion of moisture at a temperature in the range from 15 to 120° C., especially 20 to 90° C., optionally in the presence of a catalyst and/or a desiccant such as, more particularly, vinyltriethoxysilane, tetraethoxysilane, vinyltrimethoxysilane or a molecular sieve. Preference is given to using about two moles of aminosilane per mole of lactide. More particularly, an aminosilane/lactide ratio in the range from 1.8 to 2.2 is employed. The reaction can be effected without solvent or in a suitable solvent. After the reaction, any volatile compounds present, especially solvents, unreacted reactants or alcohol released, can be removed from the reaction product by distillation.

A preferred lactide of the formula (VIII) is a lactide of lactic acid.

The reaction of at least one aminosilane of the formula (VII) with at least one lactone or carbonate of the formula (IX) is preferably conducted with exclusion of moisture at a temperature in the range from 50° C. to 150° C., especially 60° C. to 140° C., optionally in the presence of a catalyst, especially of an acid, preferably a carboxylic acid, and/or of a desiccant. The aminosilane of the formula (VII) is preferably used in a roughly stoichiometric amount relative to the lactone or carbonate of the formula (IX). More particularly, the reaction is conducted with an aminosilane/lactone or carbonate ratio in the range from 0.8 to 1.1. The reaction can be effected without solvent or in a suitable solvent.

After the reaction, any volatile compounds present, especially solvents, unreacted reactants or alcohol released, can be removed from the reaction product by distillation.

A suitable lactone or carbonate of the formula (IX) is especially γ-valerolactone, γ-hexalactone, γ-heptalactone, γ-octalactone, γ-nonalactone, γ-decalactone, γ-undecalactone, γ-dodecalactone or 1,2-propylene carbonate. Preference is given to γ-valerolactone, γ-octalactone or 1,2-propylene carbonate, particular preference to γ-valerolactone.

The polymer formulation can be prepared in a solvent or in a plasticizer, the latter suitably containing no groups reactive toward hydroxyl or isocyanate groups.

The polymer formulation can also be prepared in a further silane-functional polymer, especially in a silane-functional polymer free of end groups of the formula (I).

The polymer formulation is storage-stable with exclusion of moisture. On contact with moisture, the silane groups are hydrolyzed. This forms silanol groups (Si—OH groups), and subsequent condensation reactions form siloxane groups (Si—O—Si groups). As a result of these reactions, the polymer formulation cures to give a crosslinked plastic. The water for the curing can either come from the air (air humidity), or the polymer formulation can be contacted with a water-containing component.

The polymer formulation described has advantageous properties. It is surprisingly of low viscosity, is very storage-stable and cures rapidly with moisture at room temperature to give elastic, nontacky materials of good strength and extensibility.

Surprisingly, it is of much lower viscosity than a blend of two silane-functional polymers in which one polymer has only end groups of the formula (I) and the other polymer has only further silane end groups that do not correspond to the formula (I) when these two polymers are blended in such a ratio that the ratio of the different end groups in the mixture corresponds roughly to that of the silane-functional polymers in the polymer formulation of the invention.

Preferably, the polymer formulation has a viscosity at 20° C. in the range from 2 to 200 Pa·s, more preferably 3 to 150 Pa·s, especially 4 to 100 Pa·s, most preferably 5 to 75 Pa·s.

The present invention further provides a composition comprising at least one polymer formulation as described above.

Preferably, the composition comprises at least one further constituent selected from fillers, crosslinkers, plasticizers, solvents, catalysts, adhesion promoters, desiccants, stabilizers, pigments and rheology aids.

The composition can especially be used as an elastic adhesive or sealant or as an elastic coating.

Preferably, the composition has a content of silane-functional polymers in the range from 5% to 95% by weight, especially in the range from 20% to 80% by weight.

More preferably, the composition has a content in the range from 5% to 95% by weight, especially 20% to 80% by weight, of the polymer formulation described.

It may be advantageous when the composition, as well as the polymer formulation described, contains at least one further silane-functional polymer. If such a further silane-functional polymer has a lower reactivity than the polymer formulation, this can have a significant accelerating effect on the composition. Preferred further silane-functional polymers are commercially available silane-functional polymers, especially products known by the trade names MS Polymer™ (from Kaneka Corp.; especially the products S203H, S303H, S227, S810, MA903 or S943); MS Polymer™ or Silyl™ (from Kaneka Corp.; especially the products SAT010, SAT030, SAT200, SAX350, SAX400, SAX725, MAX450, MAX602 or MAX951); Excestar® (from Asahi Glass Co. Ltd.; especially the products S2410, S2420, S3430 or S3630); SPUR+* (from Momentive Performance Materials; especially the products 1010LM, 1015LM or 1050MM); Vorasil™ (from Dow Chemical Co.; especially the products 602 or 604); Desmoseal® (from Bayer MaterialScience AG; especially the products S XP 2636, S XP 2749, S XP 2774 or S XP 2821); TEGOPAC® (from Evonik Industries AG; especially the products Seal 100, Bond 150 or Bond 250); or Geniosil® STP (from Wacker Chemie AG; especially the products E15 or E35).

Preferably, the composition comprises at least one catalyst that accelerates the crosslinking of silane-functional polymers. Especially suitable for the purpose are metal catalysts and/or nitrogen compounds.

Suitable metal catalysts are especially compounds of titanium, zirconium, aluminum or tin, especially organotin compounds, organotitanates, organozirconates or organoaluminates, where these compounds especially have alkoxy groups, aminoalkoxy groups, sulfonate groups, carboxyl groups, 1,3-diketonate groups, 1,3-ketoesterate groups, dialkylphosphate groups and dialkylpyrophosphate groups.

Particularly suitable organotin compounds are dialkyltin oxides, dialkyltin dichlorides, dialkyltin dicarboxylates and dialkyltin diketonates, especially dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate and dioctyltin diacetylacetonate, or alkyltin thioesters.

Particularly suitable organotitanates are:
titanium(IV) complexes having two 1,3-diketonate ligands, especially 2,4-pentanedionate (=acetylacetonate), and two alkoxide ligands;
titanium(IV) complexes having two 1,3-ketoesterate ligands, especially ethylacetoacetate, and two alkoxide ligands;
titanium(IV) complexes having one or more aminoalkoxide ligands, especially triethanolamine or 2-((2-aminoethyl)amino)ethanol, and one or more alkoxide ligands;
titanium(IV) complexes having four alkoxide ligands;
and more highly condensed organotitanates, especially oligomeric titanium(IV) tetrabutoxide, also referred to as polybutyl titanate;
where suitable alkoxide ligands are especially isobutoxy, n-butoxy, isopropoxy, ethoxy and 2-ethylhexoxy.

Very particularly suitable are bis(ethylacetoacetato)diisobutoxytitanium(IV), bis(ethylacetoacetato)diisopropoxytitanium(IV), bis(acetylacetonato)diisopropoxytitanium(IV), bis(acetylacetonato)diisobutoxytitanium(IV), tris(oxyethyl)amineisopropoxytitanium(IV), bis[tris(oxyethyl)amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxydiethoxytitanium(IV), titanium(IV) tetrabutoxide, tetra (2-ethylhexyloxy)titanate, tetra(isopropoxy)titanate or polybutyl titanate. Especially suitable are the following commercially available products: Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the following commercially available products: Ken-React® NZ® 38J, KZ® TPPJ, KZ® TPP, NZ® 01, 09, 12, 38, 44 or 97 (all from Kenrich Petrochemicals) or Snapcure® 3020, 3030, 1020 (all from Johnson Matthey & Brandenberger).

A particularly suitable organoaluminate is the commercially available product K-Kat 5218 (from King Industries).

Nitrogen compounds suitable as catalyst are especially amines such as, more particularly, N-ethyldiisopropylamine, N,N,N',N'-tetramethylalkylenediamines, polyoxyalkyleneamines, 1,4-diazabicyclo[2.2.2]octane; aminosilanes such as, more particularly, 3-aminopropyltrimethoxysilane, 3-aminopropyldimethoxymethylsilane, N-(2-aminoethyl)-3- aminopropyltrimethoxysilane, N-(2-aminoethyl)-3-aminopropylmethyldimethoxysilane, N-(2-aminoethyl)-N'-[3-(trimethoxysilyl)-propyl]ethylenediamine or the analogs thereof having ethoxy or isopropoxy in place of the methoxy groups on the silicon; cyclic amidines such as, more particularly, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, more particularly, tetramethylguanidine, 2-guanidinobenzimidazole, acetylacetoneguanidine, 1,3-di-o-tolylguanidine, 2-tert-butyl-1,1,3,3-tetramethylguanidine; or reaction products of carbodiimides and amines, such as, more particularly, polyetheramines or aminosilanes; or imidazoles such as, more particularly, N-(3-trimethoxysilylpropyl)-4,5-dihydroimidazole and N-(3-triethoxysilylpropyl)-4,5-dihydroimidazole.

Also especially suitable are combinations of various catalysts, especially combinations of at least one metal catalyst and at least one nitrogen compound.

Preferred catalysts are organotin compounds, organotitanates, amines, amidines, guanidines and imidazoles.

Particular preference is given to organotitanates and guanidines.

Additionally suitable are especially the following auxiliaries and additives:

- inorganic and organic fillers, especially natural, ground or precipitated calcium carbonates optionally coated with fatty acids, especially stearic acid, baryte (heavy spar), talcs, quartz flours, quartz sand, dolomites, wollastonites, kaolins, calcined kaolins, mica, molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow beads;
- adhesion promoters and/or crosslinkers, especially silanes such as, more particularly, aminosilanes such as, more particularly, 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)-propyl]ethylenediamine and the analogs thereof having ethoxy or isopropoxy in place of the methoxy groups on the silicon, N-phenyl-, N-cyclohexyl- or N-alkylaminosilanes, and also mercaptosilanes, epoxysilanes, (meth)acryloylsilanes, anhydridosilanes, carbamatosilanes, alkylsilanes or iminosilanes, or oligomeric forms of these silanes, or adducts formed from primary aminosilanes with epoxysilanes or (meth)acryloylsilanes or anhydridosilanes. Especially suitable are 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-ureidopropyltrimethoxysilane and the corresponding silanes having ethoxysilane groups in place of the methoxysilane groups, or oligomeric forms of these silanes;
- plasticizers, especially carboxylic esters such as phthalates, especially dioctyl phthalate, diisononyl phthalate or diisodecyl phthalate, adipates, especially dioctyl adipate, azelates, sebacates, polyols, especially polyoxyalkylenepolyols or polyesterpolyols, glycol ethers, glycol esters, organic phosphoric or sulfonic esters, polybutenes, or fatty acid methyl or ethyl esters derived from natural fats or oils, also called "biodiesel";
- solvents;
- desiccants, especially tetraethoxysilane, vinyltrimethoxy- or vinyltriethoxysilane and organoalkoxysilanes having a functional group in the a position to the silane group, especially N-(methyldimethoxysilylmethyl)-O-methylcarbamate, (methacryloyloxymethyl)silanes, methoxymethylsilanes, orthoformic esters, or calcium oxide or molecular sieves;
- stabilizers against oxidation, heat, light or UV radiation;
- pigments, especially titanium dioxide or iron oxides;
- rheology modifiers, especially thickeners, especially sheet silicates such as bentonites, derivatives of castor oil, hydrogenated castor oil, polyamides, polyurethanes, urea compounds, fumed silicas, cellulose ethers or hydrophobically modified polyoxyethylenes;
- fibers, especially glass fibers, carbon fibers, metal fibers, ceramic fibers or polymer fibers such as polyamide fibers or polyethylene fibers.
- dyes;
- natural resins, fats or oils such as rosin, shellac, linseed oil, castor oil or soya oil;
- nonreactive polymers such as, more particularly, homo- or copolymers of unsaturated monomers, especially from the group comprising ethylene, propylene, butylene, isobutylene, isoprene, vinyl acetate and alkyl (meth)acrylates, especially polyethylenes (PE), polypropylenes (PP), polyisobutylenes, ethylene-vinyl acetate copolymers (EVA) or atactic poly-α-olefins (APAO);
- flame-retardant substances, especially the aluminum hydroxide and magnesium hydroxide fillers already mentioned, or especially organic phosphoric esters such as, more particularly, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis- and tris(isopropylphenyl) phosphate of different isopropylation levels, resorcinolbis(diphenyl phosphate), bisphenol A bis(diphenyl phosphate) or ammonium polyphosphates;
- surface-active substances, especially wetting agents, leveling agents, deaerators or defoamers;
- biocides, especially algicides, fungicides or substances that inhibit fungal growth;
- or further substances customarily used in moisture-curing compositions.

It may be advisable to chemically or physically dry certain constituents before mixing them into the composition.

In a preferred embodiment, the composition is free of heavy metal-containing organic compounds. More particularly, it is free of organotin compounds.

In a further preferred embodiment, the composition is free of cyclic amidines, especially free of 1,8-diazabicyclo[5.4.0] undec-7-ene (DBU).

The composition is preferably produced and stored with exclusion of moisture.

Typically, the composition is storage-stable with exclusion of moisture in a suitable package or arrangement, such as, more particularly, a drum, a pouch or a cartridge.

The composition may take the form of a one-component composition or of a two-component composition.

A "one-component" composition in the present document refers to a composition in which all the constituents of the composition are stored in a mixture in the same container and which is curable with moisture.

A "two-component" composition in the present document refers to a composition in which the constituents of the composition are present in two different components which are stored in separate containers. Only shortly before or during the application of the composition are the two components mixed with one another, and then the mixed composition cures, with the curing only proceeding or being completed through the action of moisture.

On application of the composition to at least one solid body or article, the silane groups present and any further moisture-reactive groups present come into contact with moisture, which results in curing of the composition. The water for the curing can either come from the air (air humidity), or the composition can be contacted with a water-containing component, for example by spreading, spraying or mixing-in. The curing proceeds at different speed according to the temperature, the nature of the contact, the amount of moisture and the presence of any catalysts. In the case of curing by means of air humidity, a skin is at first formed on the surface of the composition. What is called the tack-free time is a measure of the curing rate.

This gives rise to a cured composition obtained from a composition as described after the reaction thereof with moisture.

The composition, in the cured state, has markedly elastic properties, especially high strength and high extensibility, and also good thermal stability and good adhesion properties on various substrates. As a result, it is suitable for a multitude of uses, especially as a fiber composite material (composite), potting compound, sealant, adhesive, covering, coating or paint for construction and industrial applications, for example as an electrical insulation compound, spackling compound, joint sealant, weld or flange seam sealant, parquet adhesive, assembly adhesive, bodywork adhesive, glazing adhesive, sandwich element adhesive, floor covering, floor coating, balcony coating, roof coating, concrete protection coating, parking garage coating, or as anticorrosion paint, as seal, paint, varnish and primer.

The composition is particularly suitable as an adhesive or sealant or as a coating, especially for joint sealing and for elastic adhesive bonds in construction and industrial applications.

The invention further provides for the use of the composition described as an elastic adhesive or sealant or as an elastic coating.

For use as an adhesive or sealant, the composition preferably has a pasty consistency with structurally viscous properties. Such a pasty adhesive or sealant is especially applied to a substrate from commercial cartridges which are operated manually or by means of compressed air, or from a drum or vat by means of a conveying pump or an extruder, optionally by means of an application robot.

It is possible for two identical or two different substrates to be bonded or sealed.

Suitable substrates are especially glass, glass ceramic, screen-printed ceramic, concrete, mortar, brick, tile, gypsum or natural stone such as granite or marble;

metals and alloys such as aluminum, iron, steel and nonferrous metals, or surface-finished metals and alloys such as galvanized or chromed metals;

leather, textiles, paper, wood, wood-based materials bonded with resins, for example phenolic, melamine or epoxy resins, resin-textile composites or further polymer composites;

plastics, especially rigid or flexible PVC, ABS, polycarbonate (PC), polyamide (PA), polyester, PMMA, epoxy resins, PUR, POM, PO, PE, PP, EPM or EPDM, optionally with surface treatment of the plastics by means of plasma, corona or flames;

fiber-reinforced plastics, such as carbon fiber-reinforced plastics (CFP), glass fiber-reinforced plastics (GFP) or sheet molding compounds (SMC);

coated substrates, such as powder-coated metals or alloys;

paints or lacquers, especially automotive topcoats.

The substrates can be pretreated if required prior to the application of the adhesive or sealant, especially by physical and/or chemical cleaning methods or the application of an adhesion promoter, an adhesion promoter solution or a primer.

After the bonding or sealing of two substrates, a bonded or sealed article is obtained. Such an article may be a built structure, especially a built structure in construction or civil engineering, or it may be an industrial good or a consumer good, especially a window, a domestic appliance, or a means of transport such as, more particularly, an automobile, a bus, a truck, a rail vehicle, a ship, an aircraft or a helicopter, or an installable component thereof.

The invention further relates to a method of lowering the viscosity of a polymer having at least one end group of the formula (I) by introducing at least one further silane end group that does not correspond to the formula (I). Preferably, the further silane end group is selected from end groups of the formula (II) and end groups of the formula (III), preferably end groups of the formula (II).

The end groups of the formula (I), (II) and (III) correspond here to those described above.

By this method, it is possible to modify rapidly curing polymers having end groups of the formula (I) that are of relatively high viscosity in such a way that they have a distinctly lower viscosity, with substantial maintenance of the rapid curing.

Preferably, the method is conducted in such a way that the ratio between end groups of the formula (I) and further silane end groups comes to rest in the range from 99/1 to 5/95, preferably 97/3 to 20/80, especially 95/5 to 50/50.

Preferably, the method is conducted by the process described for preparing the polymer formulation described.

Preferably, the polymer, after the performance of this method, has a viscosity at 20° C. in the range from 2 to 200 Pa·s, more preferably 3 to 150 Pa·s, especially 4 to 100 Pa·s, most preferably 5 to 75 Pa·s.

EXAMPLES

Detailed hereinafter are working examples which are intended to illustrate the invention described in detail. Of course, the invention is not restricted to these described working examples.

"Standard climatic conditions" are understood to mean a temperature of 23±1° C. and a relative air humidity of 50±5%. "SCC" stands for "standard climatic conditions".

"TFT" stands for "tack-free time".

Viscosities were determined on a Rheotec RC30 thermostatted cone-plate viscometer (cone diameter 50 mm, cone angle 1°, cone tip-plate distance 0.05 mm, shear rate 10 s$^{-1}$) at a temperature of 20° C.

The compositions identified by "(Ref)" in tables 1 to 7 are comparative examples.

1. Starting Materials Used and Abbreviations Therefor:

Acclaim® 12200 polyoxypropylenediol with a low level of unsaturation, OH number 11.0 mg KOH/g (from Bayer MaterialScience)

Acclaim® 4200 polyoxypropylenediol with a low level of unsaturation, OH number 28.0 mg KOH/g (from Bayer MaterialScience)

Acclaim® 6300 polyoxypropylenetriol with a low level of unsaturation, OH number 28.0 mg KOH/g (from Bayer MaterialScience)

Lupranol® 4003/1 EO-endcapped polyoxypropylenetriol with 45% by weight of grafted SAN polymer, OH number 20.0 mg KOH/g (from BASF)

Synalox® 100-150B butanol-started polyoxypropylenemonool, molecular weight 2200 g/mol (from Dow)

Polyvest® EP HT hydroxyl-terminated polybutadiene, OH number 48 mg KOH/g, functionality about 2.5 (from Evonik Industries)

UCON® Hydrolube APPG-800R polyoxypropylene monoallyl ether, OH number 70 mg KOH/g, 3.5% by weight of allyl, molecular weight about 800 g/mol, (from Dow)

IPDI isophorone diisocyanate, Vestanat® IPDI (from Evonik)

TDI tolylene 2,4-diisocyanate, Desmodur® T-100 (from Bayer MaterialScience)

DIDP diisodecyl phthalate

Tyzor® IBAY bis(ethylacetoacetato)diisobutoxytitanium (IV) (from Dorf Ketal)

Tyzor® AA bis(acetylacetonato)diisopropoxytitanium(IV) (from Dorf Ketal)

VTEO vinyltriethoxysilane

VTMO vinyltrimethoxysilane

PCC precipitated calcium carbonate, Socal® U1 S2 (from Solvay)

GCC ground calcium carbonate, Omyacarb® 5 GU (from Omya)

DBU 1,8-diazabicyclo[5.4.0]undec-7-ene

Geniosil® GF 94 3-(2-aminoethyl)aminopropyltriethoxysilane

Hydroxysilanes:

Hydroxysilane 1:
N-(3-Triethoxysilylpropyl)-2-hydroxypropanamide

In a round-bottom flask, 20.00 g (90.4 mmol) of 3-aminopropyltriethoxysilane and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 2:
N-(3-Triethoxysilylpropyl)-4-hydroxypentanamide

In a round-bottom flask, 20.00 g (90.4 mmol) of 3-aminopropyltriethoxysilane and 10.86 g (108.5 mmol) of γ-valerolactone were stirred under a nitrogen atmosphere at 135° C. for 6 h until no further progress in the reaction was detected by means of IR spectroscopy. The crude product was aftertreated at 80° C. and about 2 mbar for 30 min. A colorless liquid product was obtained.

Hydroxysilane 3: Mixture comprising 2-hydroxypropyl N-(3-triethoxysilylpropyl)carbamate and 1-hydroxyprop-2-yl N-(3-triethoxysilylpropyl)carbamate In a round-bottom flask, 20.00 g (90.4 mmol) of 3-aminopropyltriethoxysilane and 9.51 g (93.1 mmol) of 1,2-propylene carbonate were stirred under a nitrogen atmosphere at 80° C. for 5 h until no further progress in the reaction was detected by means of IR spectroscopy. The crude product was aftertreated at 60° C. and about 10 mbar for 10 min. A colorless liquid product was obtained.

Hydroxysilane 4: N-(3-Diethoxymethylsilylpropyl)-2-hydroxypropanamide

In a round-bottom flask, 17.30 g (90.4 mmol) of 3-aminopropyldiethoxymethylsilane (Dynasylan® 1505 from Evonik Industries) and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 5:
N-(3-Trimethoxysilylpropyl)-2-hydroxypropanamide

In a round-bottom flask, 16.21 g (90.4 mmol) of 3-aminopropyltrimethoxysilane and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 6: N-(3-Dimethoxymethylsilylpropyl)-2-hydroxypropanamide

In a round-bottom flask, 14.76 g (90.4 mmol) of 3-aminopropyldimethoxymethylsilane (Silquest® A-2110 from Momentive) and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 7: N-(2,2-Dimethyl-4-dimethoxymethylsilylbutyl)-2-hydroxypropanamide In a round-bottom flask, 18.57 g (90.4 mmol) of 4-amino-3,3-dimethylbutyldimethoxymethylsilane (Silquest® A-2639 from Momentive) and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 8: N-(2,2-Dimethyl-4-trimethoxysilylbutyl)-2-hydroxypropanamide

In a round-bottom flask, 20.01 g (90.4 mmol) of 4-amino-3,3-dimethylbutyltrimethoxysilane (Silquest® A-1637 from Momentive) and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

2. Preparation of Silane-Functional Polymers:

Inventive Polymer Formulations:

Polymer M-1:

With exclusion of moisture, 50.000 g of Acclaim® 12200 and 0.05 g of vinyltriethoxysilane were stirred under reduced pressure at 80° C. for 30 min. Subsequently, 0.050 g of bismuth tris(neodecanoate) (10% by weight in DIDP) and 0.124 g of isocyanatopropyltriethoxysilane were added and the reaction mixture was stirred at 80° C. under reduced pressure for 2 h until no isocyanate groups were detectable any longer by means of IR spectroscopy. Then 2.175 g of IPDI were added and the mixture was stirred at 80° C. under reduced pressure for 2 h. Subsequently, 3.206 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 149 Pa·s (20° C.).

Polymer M-2:

Polymer M-2 was prepared and stored as described for polymer M-1, except using 0.247 g of isocyanatopropyltriethoxysilane, 2.061 g of IPDI and 3.037 g of hydroxysilane 1. It was clear and, the day after the preparation, had a viscosity of 132 Pa·s (20° C.).

Polymer M-3:

Polymer M-3 was prepared and stored as described for polymer M-1, except using 0.742 g of isocyanatopropyltriethoxysilane, 1.603 g of IPDI and 2.362 g of hydroxysilane 1. It was clear and, the day after the preparation, had a viscosity of 75 Pa·s (20° C.).

Polymer M-4:

Polymer M-4 was prepared and stored as described for polymer M-1, except using 1.237 g of isocyanatopropyltriethoxysilane, 1.145 g of IPDI and 1.687 g of hydroxysilane 1. It was clear and, the day after the preparation, had a viscosity of 38 Pa·s (20° C.).

Polymer M-5:

Polymer M-5 was prepared and stored as described for polymer M-1, except using 1.732 g of isocyanatopropyltriethoxysilane, 0.687 g of IPDI and 1.012 g of hydroxysilane 1. It was clear and, the day after the preparation, had a viscosity of 22 Pa·s (20° C.).

Polymer M-6:

Polymer M-6 was prepared and stored as described for polymer M-1, except using 1.979 g of isocyanatopropyltriethoxysilane, 0.458 g of IPDI and 0.675 g of hydroxysilane 1. It was clear and, the day after the preparation, had a viscosity of 17 Pa·s (20° C.).

Polymer M-7:

Polymer M-7 was prepared and stored as described for polymer M-1, except using 2.226 g of isocyanatopropyltriethoxysilane, 0.229 g of IPDI and 0.337 g of hydroxysilane 1. It was clear and, the day after the preparation, had a viscosity of 13 Pa·s (20° C.).

Polymer M-8:

Polymer M-8 was prepared and stored as described for polymer M-1, except using 2.350 g of isocyanatopropyltriethoxysilane, 0.114 g of IPDI and 0.169 g of hydroxysilane 1. It was clear and, the day after the preparation, had a viscosity of 11 Pa·s (20° C.).

Polymer M-10:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 6.43 g of isocyanatopropyltriethoxysilane were added and the reaction mixture was stirred at 80° C. under reduced pressure for 2 h until no isocyanate groups were detectable any longer by means of IR spectroscopy. Then 5.78 g of IPDI were added and the mixture was stirred at 80° C. under reduced pressure for 2 h. Subsequently, 8.80 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 43.1 Pa·s (20° C.).

Polymer M-11:

Polymer M-11 was prepared and stored as described for polymer M-10, except using 9.64 g of hydroxysilane 2 rather than the hydroxysilane 1. The resultant silane-functional polymer was slightly cloudy and, the day after the preparation, had a viscosity of 50.1 Pa·s (20° C.).

Polymer M-12:

Polymer M-12 was prepared and stored as described for polymer M-10, except using 9.71 g of hydroxysilane 3 rather than the hydroxysilane 1. However, isocyanate groups were still present by means of IR spectroscopy after the process described, and then a further 0.97 g of hydroxysilane 3 were added and the mixture was stirred at 80° C. under reduced pressure for 60 min until no isocyanate groups were detectable any longer by means of IR spectroscopy. The resultant silane-functional polymer was slightly cloudy and, the day after the preparation, had a viscosity of 33.2 Pa·s (20° C.).

Polymer M-13:

Polymer M-13 was prepared and stored as described for polymer M-10, except using 4.53 g of TDI rather than IPDI. The resultant silane-functional polymer was clear and, the day after the preparation, had a viscosity of 28.8 Pa·s (20° C.).

Polymer M-14:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 4.95 g of isocyanatopropyltriethoxysilane were added and the reaction mixture was stirred at 80° C. under reduced pressure for 2 h until no isocyanate groups were detectable any longer by means of IR spectroscopy. Then 5.56 g of IPDI were added and the mixture was stirred at 80° C. under reduced pressure for 2 h. Subsequently, 6.75 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 60.3 Pa·s (20° C.).

Polymer M-15:

With exclusion of moisture, 210.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 3.96 g of isocyanatopropyltriethoxysilane were added and the reaction mixture was stirred at 80° C. under reduced pressure for 2 h until no isocyanate groups were detectable any longer by means of IR spectroscopy. Then 28.00 g of Acclaim® 4200 and 7.11 g of IPDI were added and the mixture was stirred at 80° C. under reduced pressure for 2 h. Subsequently, 8.10 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 104.0 Pa·s (20° C.).

Polymer M-16:

Polymer M-16 was prepared and stored as described for polymer M-10, except using 7.90 g of hydroxysilane 4 rather than the hydroxysilane 1. The resultant silane-functional polymer was clear and, the day after the preparation, had a viscosity of 47.0 Pa·s (20° C.).

Polymer M-17:

With exclusion of moisture, 250.00 g of Acclaim® 12200 and 0.25 g of vinyltrimethoxysilane were stirred under reduced pressure at 80° C. for 30 min. Subsequently, 0.25 g of bismuth tris(neodecanoate) (10% by weight in DIDP) and 5.34 g of isocyanatopropyltrimethoxysilane were added and the reaction mixture was stirred at 80° C. without reduced pressure for 45 min, then at 80° C. under reduced pressure for 45 min, until no isocyanate groups were detectable any longer by means of IR spectroscopy. Then 5.78 g of IPDI were added and the mixture was stirred at 80° C. under reduced pressure for 2 h. Subsequently, 7.54 g of hydroxysilane 5 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 37.9 Pa·s (20° C.).

Polymer M-18:

Polymer M-18 was prepared and stored as described for polymer M-17, except using 7.06 g of hydroxysilane 6 rather than the hydroxysilane 5. The resultant silane-functional polymer was clear and, the day after the preparation, had a viscosity of 68.0 Pa·s (20° C.).

Polymer M-19:

Polymer M-19 was prepared and stored as described for polymer M-17, except using 8.32 g of hydroxysilane 7 rather than the hydroxysilane 5. The resultant silane-functional polymer was clear and, the day after the preparation, had a viscosity of 72.0 Pa·s (20° C.).

Polymer M-20:

Polymer M-20 was prepared and stored as described for polymer M-17, except using 8.80 g of hydroxysilane 8 rather than the hydroxysilane 5. The resultant silane-functional polymer was clear and, the day after the preparation, had a viscosity of 70.0 Pa·s (20° C.).

Polymer M-21:

With exclusion of moisture, 250.00 g of Acclaim® 12200 and 0.25 g of vinyltriethoxysilane were stirred under reduced pressure at 80° C. for 30 min. Then 0.25 g of bismuth tris(neodecanoate) (10% by weight in DIDP) and 3.71 g of isocyanatopropyltriethoxysilane were added and the reaction mixture was stirred at 80° C. under reduced pressure for 60 min until no isocyanate groups were detectable any longer by means of IR spectroscopy. Subsequently, 8.23 g of IPDI were added and the mixture was stirred at 80° C. under reduced pressure for 2 h. Finally, 10.27 g of hydroxysilane 1 were added, the mixture was stirred at 80° C. under reduced pressure for 90 min, then 3.94 g of diethyl N-(3-triethoxysilylpropyl)aspartate were added and the mixture was stirred at 80° C. under reduced pressure for another 30 min until no isocyanate groups were detectable any longer by means of IR spectroscopy. The silane-functional polymer was cooled down to room temperature and stored with exclusion of moisture. It was clear and, the day after the preparation, had a viscosity of 72.2 Pa·s (20° C.).

Polymer M-22:

With exclusion of moisture, 200.00 g of Acclaim® 4200 and 0.25 g of vinyltriethoxysilane were stirred under reduced pressure at 80° C. for 30 min. Then 0.25 g of bismuth tris(neodecanoate) (10% by weight in DIDP) and 7.41 g of IPDI were added and the reaction mixture was stirred at 80° C. under reduced pressure for 1 h until no isocyanate groups were detectable any longer by means of IR spectroscopy. Then 4.21 g of isocyanatopropyltriethoxysilane were added and the reaction mixture was stirred at 80° C. under reduced pressure for 1 h until no isocyanate groups were detectable any longer by means of IR spectroscopy. Then 3.83 g of IPDI were added and the mixture was stirred at 80° C. under reduced pressure for 2 h. Then 6.07 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 153 Pa·s (20° C.).

Polymer M-23:

Polymer M-23 was prepared and stored as described for polymer M-10, except using 200.00 g of Acclaim® 6300 rather than Acclaim® 12200 and 12.86 g of isocyanatopropyltriethoxysilane, 11.56 g of IPDI and 17.54 g of hydroxysilane 1. The resultant silane-functional polymer was clear and, the day after the preparation, had a viscosity of 25.9 Pa·s (20° C.).

Polymer M-24:

Polymer M-24 was prepared and stored as described for polymer M-10, except using 277.8 g of Lupranol® 4003/1 rather than Acclaim® 12200 and 12.86 g of isocyanatopropyltriethoxysilane, 11.56 g of IPDI and 17.54 g of hydroxysilane 1. The resultant silane-functional polymer was clear and, the day after the preparation, had a viscosity of 94.7 Pa·s (20° C.).

Polymer M-25:

With exclusion of moisture, 250.00 g of Acclaim® 12200 and 0.25 g of vinyltriethoxysilane were stirred under reduced pressure at 80° C. for 30 min. Then 0.25 g of bismuth tris(neodecanoate) (10% by weight in DIDP) and 8.53 g of isocyanatopropyltriethoxysilane were added and the reaction mixture was stirred at 80° C. under reduced pressure for 2 h until no isocyanate groups were detectable any longer by means of IR spectroscopy. Subsequently, 43.86 g of Synalox® 100-150B and 7.78 g of IPDI were added and the mixture was stirred at 80° C. under reduced pressure for 2 h. Then 11.74 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 18.4 Pa·s (20° C.).

Polymer M-26:

Polymer M-26 was prepared and stored as described for polymer M-10, except using 150.00 g of Polyvest® EP HT rather than Acclaim® 12200 and 16.08 g of isocyanatopropyltriethoxysilane, 14.23 g of IPDI and 20.03 g of hydroxysilane 1. The resultant silane-functional polymer was clear and, the day after the preparation, had a viscosity of 204 Pa·s (20° C.).

Polymer M-27:

With exclusion of moisture, 250.00 g of NCO polymer 1, the preparation of which is described below, 0.25 g of bismuth tris(neodecanoate) (10% by weight in DIDP) and 3.93 g of hydroxysilane 1 were stirred under a nitrogen atmosphere at 80° C. until the isocyanate band in the IR spectrum was constant (about 2 h). Then 11.29 g of diethyl N-(3-triethoxysilylpropyl)aspartate were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 109 Pa·s (20° C.).

The NCO polymer 1 was prepared by heating, with exclusion of moisture, 720.0 g of Acclaim® 12200, 34.5 g of IPDI, 80.0 g of DIDP and 0.1 g of bismuth tris(neodecanoate) (10% by weight in DIDP) to 90° C. while stirring and leaving the mixture at this temperature until the content of free isocyanate groups, determined by titrimetry, had reached a stable value of 0.73% by weight. The polymer having isocyanate groups was cooled down to room temperature and stored with exclusion of moisture. It was clear and, the day after the preparation, had a viscosity of 31 Pa·s (20° C.).

Polymer M-28:

Polymer M-28 was prepared and stored as described for polymer M-27, except using 8.42 g of hydroxysilane 1 and 5.27 g of diethyl N-(3-triethoxysilylpropyl)aspartate. The resultant silane-functional polymer was clear and, the day after the preparation, had a viscosity of 168 Pa·s (20° C.).

Polymer M-29:

With exclusion of moisture and under a nitrogen atmosphere, 10.00 g of dried UCON® Hydrolube APPG-800R, 10 μl of Karstedt catalyst and 1.66 g of triethoxysilane were converted at 60° C. for 1 h until no allyl groups were detectable any longer by means of IR spectroscopy. Then the reaction mixture was stirred at 80° C. and 15 mbar for 20 min. Subsequently, 2.29 g of IPDI and 0.05 g of dibutyltin dilaurate were added and the mixture was stirred at 80° C. under reduced pressure for 1 h until the isocyanate band in the IR spectrum was constant. Finally, 3.55 g of hydroxysilane 1 and 0.05 g of Coscat® 83 (Bi(III) neodecanoate, from Vertellus) were added and the mixture was stirred at 80° C. under reduced pressure for 60 min until no isocyanate groups were detectable any longer by means of IR spectroscopy. The silane-functional polymer was cooled down to room temperature and stored with exclusion of moisture. It was clear and slightly dark-colored and, the day after the preparation, had a viscosity of 2.8 Pa·s (20° C.).

Polymer M-30:

Polymer M-30 was prepared and stored as described for polymer M-29, except using 3.89 g of hydroxysilane 2 in place of hydroxysilane 1. The resultant silane-functional polymer had minimal turbidity, was pale yellowish in color and, the day after the preparation, had a viscosity of 3.7 Pa·s (20° C.).

Silane-Functional Comparative Polymers Having Only End Groups of the Formula (I):

Polymer E-1:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 11.56 g of IPDI were added and the mixture was stirred at 80° C. under reduced pressure for 2 h. Then 17.32 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 263.5 Pa·s (20° C.).

Polymer E-2:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 11.56 g of IPDI were added and the mixture was stirred at 80° C. under reduced pressure for 2 h. Then 19.93 g of hydroxysilane 2 were added and the mixture was stirred at 80° C. under reduced pressure for 120 min until no isocyanate groups were detectable any longer by means of IR spectroscopy. The silane-functional polymer was cooled down to room temperature and stored with exclusion of moisture. It was cloudy and, the day after the preparation, had a viscosity of 272.9 Pa·s (20° C.).

Polymer E-3:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 11.56 g of IPDI were added and the mixture was stirred at 80° C. under reduced pressure for 2 min. Then 19.08 g of hydroxysilane 3 were added and the mixture was stirred at 80° C. under reduced pressure for 120 min. Isocyanate groups were still present by means of IR spectroscopy, and then a further 1.91 g of hydroxysilane 3 were added and the mixture was stirred at 80° C. under reduced pressure for 60 min until no isocyanate groups were detectable any longer by means of IR spectroscopy. The silane-functional polymer was cooled down to room temperature and stored with exclusion of moisture. It was cloudy and, the day after the preparation, had a viscosity of 169.9 Pa·s (20° C.).

Polymer E-4:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 9.06 g of TDI were added and the mixture was stirred at 80° C. without reduced pressure for 1 h, then at 80° C. under reduced pressure for 1 h. Subsequently, 17.32 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 85.2 Pa·s (20° C.).

Polymer E-5:

With exclusion of moisture, 250.00 g of Acclaim® 12200 and 0.25 g of vinyltrimethoxysilane were stirred under reduced pressure at 80° C. for 30 min. Subsequently, 0.25 g of bismuth tris(neodecanoate) (10% by weight in DIDP) and 11.56 g of IPDI were added and the mixture was stirred at 80° C. under reduced pressure for 2 h. Then 14.83 g of hydroxysilane 5 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 179.1 Pa·s (20° C.).

Silane-Functional Comparative Polymers with Further Silane End Groups:

Polymer R-1:

With exclusion of moisture, 250.00 g of Acclaim® 12200 and 0.25 g of vinyltriethoxysilane were stirred at 80° C. for 30 min and then 0.25 g of bismuth tris(neodecanoate) (10% by weight in DIDP) and 12.49 g of isocyanatopropyltriethoxysilane were added and the reaction mixture was stirred at 80° C. under reduced pressure for 2 h. Subsequently, 1.50 g of ethanol were added and the mixture was stirred without reduced pressure for 15 minutes, then under reduced pressure for a further 15 minutes. No isocyanate band was detected any longer in the FT-IR. The silane-functional polymer was cooled down to room temperature and stored with exclusion of moisture. It was clear and, the day after the preparation, had a viscosity of 10 Pa·s.

Polymer R-2:

With exclusion of moisture, 250.00 g of Acclaim® 12200 and 0.25 g of vinyltrimethoxysilane were stirred at 80° C. for 30 min and then 0.25 g of bismuth tris(neodecanoate) (10% by weight in DIDP) and 10.37 g of isocyanatopropyltrimethoxysilane were added and the reaction mixture was stirred at 80° C. under reduced pressure for 2 h. Subsequently, 1.50 g of methanol were added and the mixture was stirred without reduced pressure for 15 minutes, then under reduced pressure for a further 15 minutes. No isocyanate band was detected any longer in the FT-IR. The silane-functional polymer was cooled down to room temperature and stored with exclusion of moisture. It was clear and, the day after the preparation, had a viscosity of 11 Pa·s.

Polymer R-3:

Polymer R-3 was prepared and stored as described for polymer M-25, except using 15.74 g of diethyl N-(3-triethoxysilylpropyl)aspartate rather than the hydroxysilane 1. The resultant silane-functional polymer was clear and, the day after the preparation, had a viscosity of 14.2 Pa·s (20° C.).

Polymer R-4:

With exclusion of moisture, 100.00 g of NCO polymer 1, the preparation of which was described for polymer M-27, 0.06 g of bismuth tris(neodecanoate) (10% by weight in DIDP) and 7.19 g of diethyl N-(3-triethoxysilylpropyl) aspartate were stirred under a nitrogen atmosphere at 80° C. until no isocyanate groups were detectable any longer by means of IR spectroscopy (about 1.5 h). The silane-functional polymer was cooled down to room temperature and stored with exclusion of moisture. It was clear and, the day after the preparation, had a viscosity of 83 Pa·s (20° C.).

3. Moisture-Curing Compositions (Unfilled)

Compositions Z1 to Z18:

For each composition, the ingredients specified in table 1 were processed in the amounts specified (in parts by weight) in a vacuum mixer at 50° C. with exclusion of moisture for 30 min to give a homogeneous paste, and stored.

Each composition was tested as follows:

The viscosity was determined the day after the preparation, with a thermostatted Rheotec RC30 cone-plate viscometer (cone diameter 50 mm, cone angle 1°, cone tip-plate distance 0.05 mm, shear rate 10 s$^{-1}$) at a temperature of 20° C.

To determine the tack-free time (TFT), a few grams of the composition were applied to cardboard in a layer thickness of about 2 mm and, under standard climatic conditions, the time until, when the surface of the composition was tapped gently by means of an LDPE pipette, there were for the first time no remaining residues on the pipette was determined.

TABLE 1

Composition and properties of the compositions Z1 to Z10.

| | Composition | | | | | | | | | |
|---|---|---|---|---|---|---|---|---|---|---|
| | Z1 (Ref) | Z2 | Z3 | Z4 | Z5 | Z6 | Z7 | Z8 | Z9 | Z10 (Ref) |
| Polymer | E-1 | M-1 | M-2 | M-3 | M-4 | M-5 | M-6 | M-7 | M-8 | R-1 |
| | 100.0 | 100.0 | 100.0 | 100.0 | 100.0 | 100.0 | 100.0 | 100.0 | 100.0 | 100.0 |
| Tyzor ® IBAY | 2.5 | 2.5 | 2.5 | 2.5 | 2.5 | 2.5 | 2.5 | 2.5 | 2.5 | 2.5 |
| End gr. (I)/others[1] | 100/0 | 95/5 | 90/10 | 70/30 | 50/50 | 30/70 | 20/80 | 10/90 | 5/95 | 0/100 |
| Viscosity [Pa · s] | 258 | 149 | 132 | 75 | 38 | 22 | 17 | 13 | 11 | 9 |
| TFT [min.] | 66 | 72 | 75 | 74 | 78 | 86 | 90 | 90 | 88 | 86 |

[1]Ratio of the number of end groups of the formula (I) to the number of other silane groups

TABLE 2

Composition and properties of the compositions Z1 and Z10 to Z18.

| | Composition | | | | | | | | | |
|---|---|---|---|---|---|---|---|---|---|---|
| | Z1 (Ref) | Z11 (Ref) | Z12 (Ref) | Z13 (Ref) | Z14 (Ref) | Z15 (Ref) | Z16 (Ref) | Z17 (Ref) | Z18 (Ref) | Z10 (Ref) |
| Polymer | E-1 | E-1 | E-1 | E-1 | E-1 | E-1 | E-1 | E-1 | E-1 | R-1 |
| | 100.0 | 95.0 | 90.0 | 70.0 | 50.0 | 30.0 | 20.0 | 10.0 | 5.0 | 100.0 |
| | | R-1 | R-1 | R-1 | R-1 | R-1 | R-1 | R-1 | R-1 | |
| | | 5.0 | 10.0 | 30.0 | 50.0 | 70.0 | 80.0 | 90.0 | 95.0 | |
| Tyzor ® IBAY | 2.5 | 2.5 | 2.5 | 2.5 | 2.5 | 2.5 | 2.5 | 2.5 | 2.5 | 2.5 |
| Viscosity [Pa · s] | 258 | 190 | 162 | 90 | 45 | 24 | 17 | 13 | 11 | 9 |
| TFT [min.] | 66 | 69 | 73 | 71 | 71 | 72 | 74 | 79 | 81 | 86 |

4. Moisture-Curing Compositions (Filled)

Compositions Z19 to Z56

For each composition, the ingredients specified in tables 3 to 7 were processed in the amounts specified (in parts by weight) in a vacuum mixer at 50° C. with exclusion of moisture for 30 min to give a homogeneous paste, and stored.

Each composition was tested as follows:

Viscosity and tack-free time were tested as described for composition Z1. Shore A hardness was determined in accordance with DIN 53505 on test specimens which had been cured under standard climatic conditions for 14 days.

To determine the mechanical properties, the composition was cast on a PTFE-coated film to give a film of thickness 2 mm, which was stored under standard climatic conditions for 2 weeks, and some dumbbells having a length of 75 mm with a bar length of 30 mm and a bar width of 4 mm were punched out of the film and these were tested in accordance with DIN EN 53504 at a pulling speed of 200 mm/min for tensile strength (breaking force), elongation at break and modulus of elasticity (modulus of elasticity at 0.5%-5% elongation).

The results are reported in tables 3 to 7.

The thickener paste was produced by initially charging a vacuum mixer with 300 g of diisodecyl phthalate and 48 g of 4,4'-methylene diphenyl diisocyanate (Desmodur® 44 MC L; from Bayer), heating them gently and then, while stirring vigorously, gradually adding 27 g of monobutylamine dropwise. The resultant paste was stirred for a further hour under vacuum and while cooling.

TABLE 3

Composition and properties of the compositions Z19 to Z33.

| | Z19 (Ref.) | Z20 (Ref.) | Z21 (Ref.) | Z22 | Z23 (Ref.) | Z24 (Ref.) | Z25 |
|---|---|---|---|---|---|---|---|
| Polymer | R-1 20.0 | E-1 20.0 | R-1 10.0 E-1 10.0 | M-10 20.0 | E-2 20.0 | R-1 10.0 E-2 10.0 | M-11 20.0 |
| DIDP | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 |
| VTEO | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 |
| Tyzor® IBAY | 1.6 | 1.6 | 1.6 | 1.6 | 1.6 | 1.6 | 1.6 |
| Viscosity [Pa·s] | 38.1 | 96.9 | 47.7 | 42.2 | 114.5 | 63.8 | 49.8 |
| TFT [min] | 150 | 60 | 80 | 70 | 70 | 75 | 80 |
| Shore A | 39 | 36 | 39 | 40 | 28 | 37 | 40 |
| Tensile strength [MPa] | 1.1 | 1.6 | 1.5 | 1.5 | 0.8 | 1.0 | 1.1 |
| Elongation at break [%] | 171 | 162 | 133 | 147 | 133 | 118 | 121 |
| Modulus of elasticity [MPa] | 1.3 | 1.8 | 1.8 | 1.9 | 0.5 | 0.8 | 0.9 |

| | Z26 (Ref.) | Z27 (Ref.) | Z28 | Z29 (Ref.) | Z30 | Z31 | Z32 | Z33 |
|---|---|---|---|---|---|---|---|---|
| Polymer | E-3 20.0 | R-1 10.0 E-3 10.0 | M-12 20.0 | E-4 20.0 | M-13 20.0 | M-14 20.0 | M-15 20.0 | M-16 20.0 |
| DIDP | 17.6 | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 | 5.9 |
| VTEO | 1.0 | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 | 50.0 |
| Tyzor® IBAY | 1.6 | 1.6 | 1.6 | 1.6 | 1.6 | 1.6 | 1.6 | 1.6 |
| Viscosity [Pa·s] | 78.5 | 52.5 | 49.9 | 69.4 | 43.8 | 53.0 | 72.0 | 55.2 |
| TFT [min] | 80 | 85 | 85 | 75 | 70 | 85 | 55 | 120 |
| Shore A | 32 | 36 | 37 | 45 | 47 | 38 | 38 | 39 |
| Tensile strength [MPa] | 1.0 | 1.1 | 1.2 | 1.5 | 1.4 | 1.3 | 1.4 | 1.5 |
| Elongation at break [%] | 156 | 146 | 137 | 138 | 129 | 160 | 195 | 185 |
| Modulus of elasticity [MPa] | 0.6 | 1.1 | 1.2 | 1.8 | 1.8 | 1.2 | 1.3 | 1.6 |

TABLE 4

Composition and properties of the compositions Z34 to Z40.

| | Z34 (Ref.) | Z35 (Ref.) | Z36 (Ref.) | Z37 | Z38 | Z39 | Z40 |
|---|---|---|---|---|---|---|---|
| Polymer | R-2 20.0 | E-5 20.0 | R-2 10.0 E-5 10.0 | M-17 20.0 | M-18 20.0 | M-19 20.0 | M-20 20.0 |
| DIDP | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 |
| VTMO | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 |
| Tyzor® IBAY | 1.0 | 1.0 | 1.0 | 1.0 | — | — | — |
| Tyzor® AA | — | — | — | — | 1.6 | 1.6 | 1.6 |
| Viscosity [Pa·s] | 39.1 | 89.7 | 54.0 | 48.8 | 62.0 | 60.5 | 60.6 |
| TFT [min] | 20 | 15 | 15 | 15 | 35 | 45 | 30 |
| Shore A | 40 | 22 | 34 | 38 | 35 | 35 | 35 |
| Tensile strength [MPa] | 1.2 | 0.7 | 1.1 | 1.2 | 1.4 | 1.4 | 1.5 |
| Elongation at break [%] | 192 | 131 | 158 | 172 | 261 | 292 | 354 |
| Modulus of elasticity [MPa] | 1.4 | 0.4 | 0.9 | 1.0 | 1.5 | 1.5 | 1.6 |

TABLE 5

Composition and properties of the compositions Z41 to Z47.

| | Z41 | Z42 | Z43 | Z44 | Z45 | Z46 | Z47 (Ref.) |
|---|---|---|---|---|---|---|---|
| Polymer | M-3 20.0 | M-21 20.0 | M-22 20.0 | M-10 15.0 M-23 5.0 | M-10 15.0 M-24 9.0 | M-25 20.0 | R-3 20.0 |
| DIDP | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 |
| VTEO | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 |
| Tyzor® IBAY | 1.6 | 1.6 | 1.6 | — | — | 1.6 | 1.6 |
| Tyzor® AA | — | — | — | 2.0 | 2.0 | — | — |
| Viscosity [Pa·s] | 49.1 | 49.0 | 84.1 | 42.4 | 47.6 | 31.9 | 30.3 |
| TFT [min] | 80 | 110 | 150 | 130 | 140 | 125 | 180 |
| Shore A | 49 | 22 | 28 | 53 | 58 | 40 | 36 |
| Tensile strength [MPa] | 1.5 | 1.2 | 1.2 | 1.3 | 1.6 | 1.2 | 1.0 |
| Elongation at break [%] | 139 | 128 | 170 | 125 | 139 | 115 | 122 |

TABLE 5-continued

Composition and properties of the compositions Z41 to Z47.

|  | Composition | | | | | | |
|---|---|---|---|---|---|---|---|
|  | Z41 | Z42 | Z43 | Z44 | Z45 | Z46 | Z47 (Ref.) |
| Modulus of elasticity [MPa] | 1.6 | 1.0 | 0.8 | 2.7 | 3.4 | 1.2 | 0.8 |

TABLE 6

Composition and properties of the compositions Z48 to Z53.

|  | Composition | | | | | |
|---|---|---|---|---|---|---|
|  | Z48 | Z49 | Z50 (Ref.) | Z51 (Ref.) | Z52 | Z53 |
| Polymer | M-26 20.0 | M-10 10.0 M-26 10.0 | R-4 18.0 | E-1 18.0 | M-27 18.0 | M-28 18.0 |
| DIDP | 17.6 | 17.6 | 19.6 | 19.6 | 19.6 | 19.6 |
| Thickener paste | 5.9 | 5.9 | 5.9 | 5.9 | 5.9 | 5.9 |
| VTEO | 1.0 | 1.0 | 1.0 | 1.0 | 1.0 | 1.0 |
| PCC | 10.0 | 10.0 | 10.0 | 10.0 | 10.0 | 10.0 |
| GCC | 50.0 | 50.0 | 50.0 | 50.0 | 50.0 | 50.0 |
| Tyzor ® IBAY | 1.6 | 1.6 | 1.6 | 1.6 | 1.6 | 1.6 |
| Viscosity [Pa · s] | 118.0 | 48.4 | 55.9 | 76.0 | 59.1 | 76.3 |
| TFT [min] | 35 | 30 | >300 | 50 | 145 | 65 |
| Shore A | 66 | 61 | 20 | 37 | 36 | 37 |
| Tensile strength [MPa] | 2.4 | 1.9 | 1.1 | 1.4 | 1.1 | 1.2 |
| Elongation at break [%] | 62 | 85 | 165 | 174 | 211 | 238 |
| Modulus of elasticity [MPa] | 5.3 | 3.0 | 0.9 | 1.5 | 0.8 | 1.0 |

TABLE 7

Composition and properties of the compositions Z54 to Z56.

| Composition | Z54 | Z55 | Z56 |
|---|---|---|---|
| Polymer | M-29 18.0 | M-29 18.0 | M-30 18.0 |
| DIDP | 4.5 | 4.5 | 4.5 |
| VTEO | 1.5 | 1.5 | 1.5 |
| Tyzor ® IBAY | 1.5 | — | 1.5 |
| Fumed silica | 0.5 | 0.5 | 0.5 |
| Geniosil ® GF 94 | — | 1.5 | — |
| DBU | 0.4 | 0.4 | 0.4 |
| TFT [min] | 400 | 500 | 270 |
| Shore A | 41 | 51 | 10 |

The invention claimed is:

1. A polymer formulation comprising at least one silane-functional polymer having at least one end group of the formula (I)

$$\overset{H}{\underset{O}{\overset{\|}{N}}}-O-\underset{R^{1a}\ R^{1b}}{\overset{R^{1c}\ R^{1d}}{\underset{|}{C}}}\!\!\!\!\!\!\!\!\!\!\!\!\!\!\!\!\!\!\!\!-_n(O)_m-\overset{O}{\underset{R^2}{\overset{\|}{C}}}-N-R^3-\underset{|}{\overset{(R^4)_x}{\underset{|}{Si}}}-(OR^5)_{3-x} \quad \text{(I)}$$

where
$R^{1a}$, $R^{1b}$, $R^{1c}$ and $R^{1d}$ are each independently a hydrogen atom or a monovalent hydrocarbyl radical having 1 to 12 carbon atoms, or in pairs are each an alkylene radical having 2 to 6 carbon atoms, $R^2$ is a hydrogen atom or a monovalent hydrocarbyl radical which has 1 to 12 carbon atoms and optionally contains ether groups, ester groups, nitrile groups, amino groups or silane groups, $R^3$ is a linear or branched alkylene or cycloalkylene radical having 1 to 20 carbon atoms, optionally having aromatic components, and optionally having one or more heteroatoms, $R^4$ is an alkyl radical having 1 to 8 carbon atoms, $R^5$ is an alkyl radical which has 1 to 10 carbon atoms and optionally contains ether groups, x is 0 or 1 or 2, m is 0 or 1, and n is 0 or 1 or 2 or 3 or 4 or 5, where n, if m is 1, is 1 or 2 or 3 or 4;

and at least one further silane end group that does not correspond to the formula (I).

2. The polymer formulation as claimed in claim 1, wherein the silane-functional polymers are polyethers and/or polyesters and/or polycarbonates containing silane groups.

3. The polymer formulation as claimed in claim 1, wherein the silane-functional polymers overall have an average molecular weight in the range from 1,000 to 30,000 g/mol.

4. The polymer formulation as claimed in claim 1, wherein m is 0, n is 0, $R^{1a}$ is a methyl radical and $R^{1b}$ is a hydrogen atom.

5. The polymer formulation as claimed in claim 1, wherein m is 0, n is 2, $R^{1a}$ is a methyl radical or is an n-butyl radical, and $R^{1b}$, $R^{1c}$ and $R^{1d}$ are each a hydrogen atom.

6. The polymer formulation as claimed in claim 1, wherein m is 1, n is 1, $R^{1a}$ is a methyl radical, and $R^{1b}$, $R^{1c}$ and $R^{1d}$ are each a hydrogen atom.

7. The polymer formulation as claimed in claim 1, wherein the further silane end group is an end group of the formula (II)

$$\cdots O-\overset{O}{\overset{\|}{C}}-\underset{H}{N}-R^6-\underset{|}{\overset{(R^7)_y}{\underset{|}{Si}}}-(OR^8)_{3-y} \quad \text{(II)}$$

where
$R^6$ is a linear or branched alkylene or cycloalkylene radical having 1 to 20 carbon atoms, optionally having aromatic components, $R^7$ is an alkyl radical having 1 to 8 carbon atoms, $R^8$ is an alkyl radical which has 1 to 10 carbon atoms and optionally contains ether groups, and y is 0 or 1 or 2.

8. The polymer formulation as claimed in claim 1, wherein the further silane end group is an end group of the formula (III)

$$\cdots O\!\!\!\smallsmile\!\!\!\smallsmile\!\!\!\smallsmile\!\underset{|}{\overset{(CH_3)_z}{\underset{|}{Si}}}-(OR^9)_{3-z} \quad \text{(III)}$$

where
R⁹ is a methyl radical or an ethyl radical and
z is 0 or 1 or 2.

9. The polymer formulation as claimed in claim 1, wherein the silane-functional polymers overall have a ratio between the number of end groups of the formula (I) and the number of further silane end groups in the range from 99/1 to 5/95.

10. A process for producing the polymer formulation as claimed in claim 1, comprising the steps of
providing a polymer containing at least one hydroxyl group and at least one silane end group which does not correspond to the formula (I) as first intermediate;
reacting the first intermediate with at least one diisocyanate at an NCO/OH ratio of more than 1 to give a second intermediate; and
reacting the second intermediate with at least one hydroxysilane of the formula (VI) at an NCO/OH ratio of not more than 1

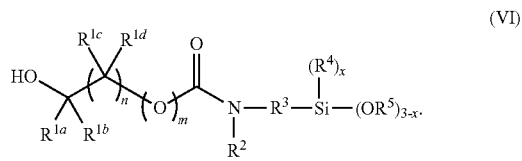

(VI)

11. The process as claimed in claim 10, wherein the first intermediate is prepared by reacting
at least one polyol with at least one isocyanatosilane of the formula (IV) at an NCO/OH ratio of less than 1

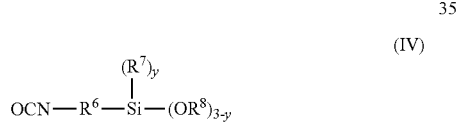

(IV)

or
at least one polyol having allyl groups with at least one hydrosilane of the formula (V) with hydrosilylation of the allyl groups

(V)

wherein
R⁶ is a linear or branched alkylene or cycloalkylene radical having 1 to 20 carbon atoms, optionally having aromatic components,
R⁷ is an alkyl radical having 1 to 8 carbon atoms,
R⁸ is an alkyl radical which has 1 to 10 carbon atoms and optionally contains ether groups,
R⁹ is a methyl radical or an ethyl radical,
y is 0 or 1 or 2, and
z is 0 or 1 or 2.

12. A composition comprising at least one polymer formulation as claimed in claim 1.

13. The composition as claimed in claim 12, wherein it has a content of silane-functional polymers in the range from 5% to 95% by weight.

14. The method for adhesively bonding, sealing or coating a substrate or surface comprising applying and subsequently curing the composition as claimed in claim 12 to said substrate or surface.

15. A method of lowering the viscosity of a polymer having at least one end group of the formula (I) comprising introducing at least one further silane end group that does not correspond to the formula (I)

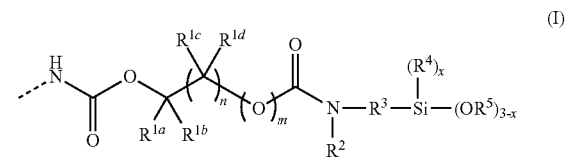

(I)

where
R¹ᵃ, R¹ᵇ, R¹ᶜ and R¹ᵈ are each independently a hydrogen atom or a monovalent hydrocarbyl radical having 1 to 12 carbon atoms, or in pairs are each an alkylene radical having 2 to 6 carbon atoms,
R² is a hydrogen atom or a monovalent hydrocarbyl radical which has 1 to 12 carbon atoms and optionally contains ether groups, ester groups, nitrile groups, amino groups or silane groups,
R³ is a linear or branched alkylene or cycloalkylene radical having 1 to 20 carbon atoms, optionally having aromatic components, and optionally having one or more heteroatoms,
R⁴ is an alkyl radical having 1 to 8 carbon atoms,
R⁵ is an alkyl radical which has 1 to 10 carbon atoms and optionally contains ether groups,
x is 0 or 1 or 2,
m is 0 or 1, and
n is 0 or 1 or 2 or 3 or 4 or 5, where n, if m is 1, is 1 or 2 or 3 or 4.

* * * * *